(12) United States Patent
Lin

(10) Patent No.: US 10,556,327 B2
(45) Date of Patent: Feb. 11, 2020

(54) HAND TOOL ASSEMBLY

(71) Applicant: Jun-Yi Lin, Taichung (TW)

(72) Inventor: Jun-Yi Lin, Taichung (TW)

( * ) Notice: Subject to any disclaimer, the term of this patent is extended or adjusted under 35 U.S.C. 154(b) by 210 days.

(21) Appl. No.: 15/836,909

(22) Filed: Dec. 11, 2017

(65) Prior Publication Data

US 2019/0176300 A1 Jun. 13, 2019

(51) Int. Cl.
*B25B 13/46* (2006.01)
*B25B 23/00* (2006.01)
*F16H 31/00* (2006.01)

(52) U.S. Cl.
CPC ........ *B25B 13/465* (2013.01); *B25B 23/0035* (2013.01); *F16H 31/002* (2013.01)

(58) Field of Classification Search
CPC .. B25B 13/465; B25B 23/0035; F16H 31/002
USPC .................................................. 81/63, 121.1
See application file for complete search history.

(56) References Cited

U.S. PATENT DOCUMENTS

| | | | | |
|---|---|---|---|---|
| 1,864,466 A | * | 6/1932 | Peterson | B25B 23/0035 403/365 |
| 4,762,033 A | * | 8/1988 | Chow | B25B 13/465 81/177.85 |
| 6,003,414 A | * | 12/1999 | Hsieh | B25B 23/0014 403/325 |
| 7,066,055 B1 | * | 6/2006 | Lee | B25B 13/465 81/177.85 |
| 7,331,258 B1 | * | 2/2008 | Hsieh | B25B 13/465 81/58.4 |

* cited by examiner

*Primary Examiner* — Hadi Shakeri

(57) ABSTRACT

A hand tool assembly includes a body having a ratchet portion, a room and a window. A driving unit is rotatably received in the ratchet portion and the room of the body. The driving unit includes a driving head, a pawl, a spring and a rotary member. The rotary member is rotated via the window to control the operational directions of the driving unit. A seat is connected to the body, and the driving unit is connected between the body and the seat. The seat includes an insertion portion formed on one end thereof, and which is engaged with the room. The seat has an engaging portion formed on the other end thereof. The seat is replaceable to make the hand tool assembly have more functions.

12 Claims, 13 Drawing Sheets

HAND TOOL ASSEMBLY

BACKGROUND OF THE INVENTION

1. Fields of the Invention

The present invention relates to a hand tool assembly, and more particularly, to a hand tool assembly that is convenient for replacing different parts.

2. Descriptions of Related Art

The conventional hand tool assembly know to applicant is disclosed in U.S. Pat. No. 5,916,339, and comprises a driving part having a bore therein, and the bore has a bore diameter. A first bearing face is formed at one end of the bore and a second bearing face is formed at the other end of the bore. A rotor is accommodated in the bore, and the rotor has a shoulder which bears on the first bearing face an one-way drive mechanism is engaged between the driving part and the rotor. An annular component is coaxial with the bore and has an outside diameter greater than the bore diameter and bearing on the second bearing face. An axial holding and adjustment screw which passes through a central orifice in the annular component. The screw has a head which holds the annular component on the second bearing face, and the screw is screwed into the rotor such that the rotor is held axially in the bore between the annular component and the shoulder of the rotor with an axial clearance determined as a function of the actual distance between the first and second bearing faces and by adjustment of the screw. The rotor comprises an axial end fitting for driving a rotary member. The axial end fitting comprises a lateral surface, an opening onto the lateral surface and a retaining element for holding the rotary member on the axial end fitting accommodated in the opening. The holding and adjustment screw comprises an axial passage and the rotor comprises a duct. The axial passage and the duct accommodate a rod therein for controlling the retaining element. The rod is displaceable between a locking position for locking the rotary member, in which position the retaining element is blocked so as to protrude from the axial end fitting, and a release position, in which position the retaining element can be retracted into the axial end fitting.

However, the head includes a handle to drive the rotor so as to form a ratchet wrench which has only one function and does not have satisfied expandability.

The present invention intends to provide a hand tool assembly that allows the users to replace different parts for different functions.

SUMMARY OF THE INVENTION

The present invention relates to a hand tool assembly and comprises a body having a ratchet portion, a room and a window. A driving unit is rotatably received in the ratchet portion and the room of the body. The driving unit includes a driving head, a pawl, a spring and a rotary member. The rotary member is rotated via the window to control the operational directions of the driving unit. A seat is connected to the body, and the driving unit is connected between the body and the seat. The seat includes an insertion portion formed on one end thereof, and which is engaged with the room. The seat has an engaging portion formed on the other end thereof.

The present invention have advantages when compared with the conventional hand tool assembly. The seat is connected to the body and may have different structures. By replacing different seats of different structure, the hand tool assembly of the present invention has more functions. The driving unit is the same as the existed driving unit, except for the flange on the driving head. The rotary member is easily operated by hand. The driving unit is slightly amended to be received in the body. The hand tool assembly is easily cooperated with the body and the seat to form the hand tool assembly of the present invention.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
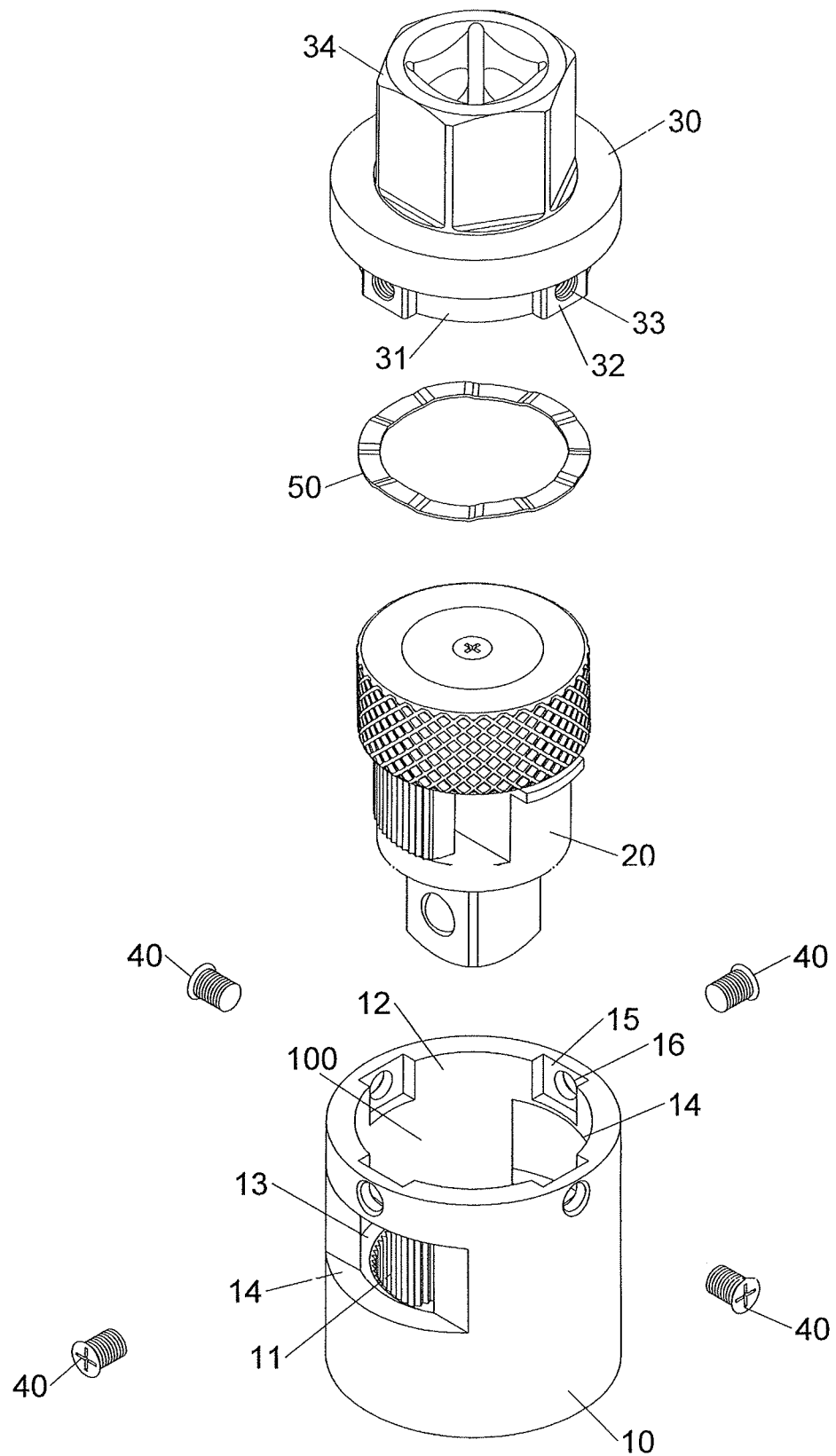
FIG. 1 is an exploded view of the hand tool assembly of the present invention.
Figure 2:
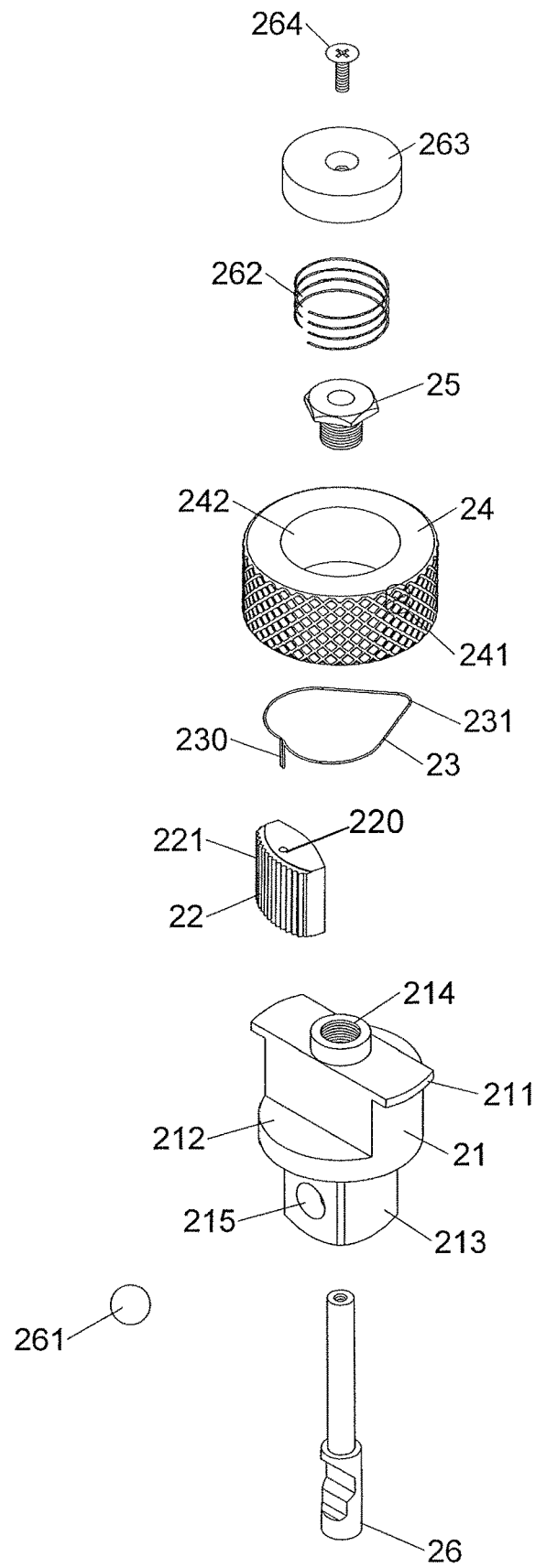
FIG. 2 is an exploded view of the driving unit of the hand tool assembly of the present invention.
Figure 4:
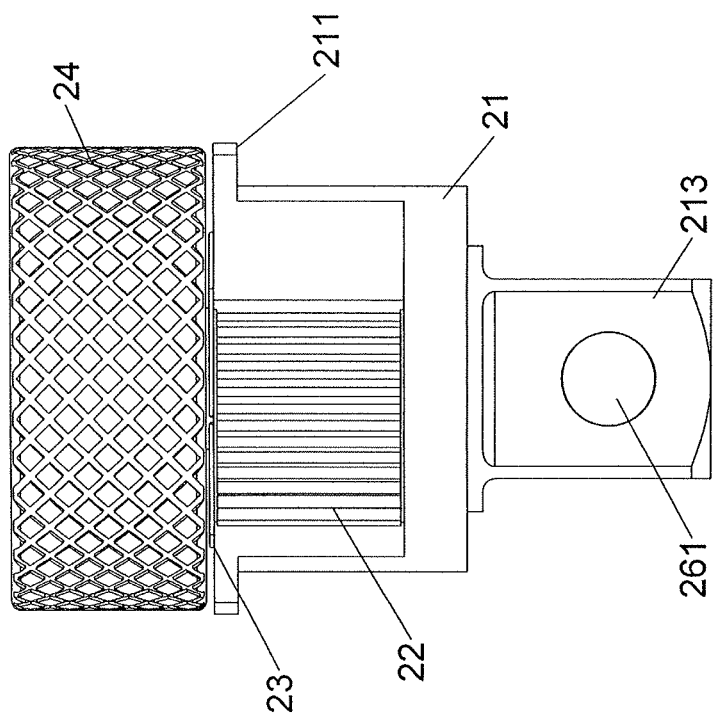
FIG. 4 is a front view of the driving unit of the hand tool assembly of the present invention.
Figure 3:
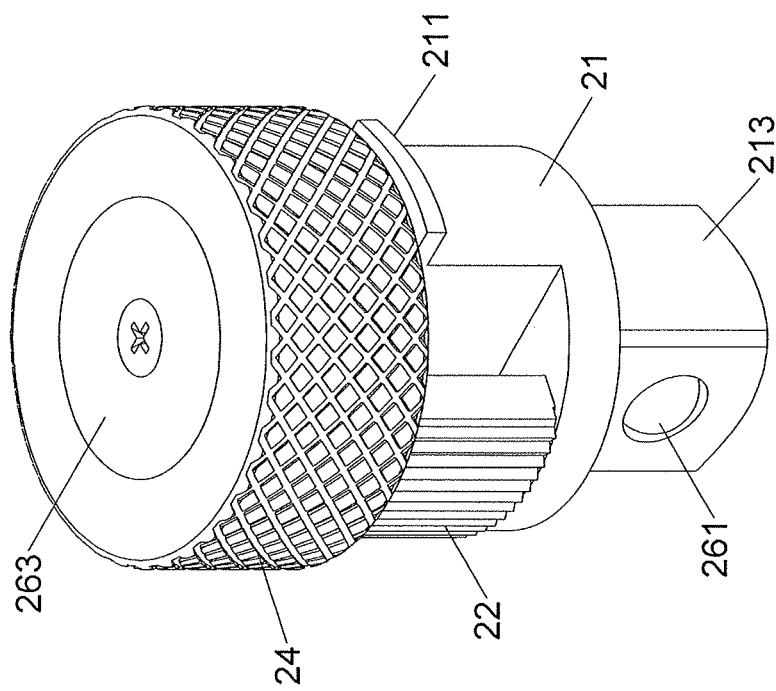
FIG. 3 is a perspective view to show the driving unit of the hand tool assembly of the present invention.

Referring to FIGS. 1 to 6, the hand tool assembly of the present invention comprises a body 10 having through hole 100 defined axially therethrough. The through hole 100 includes a ratchet portion 11 defined in the inner periphery of the first end of the body 10, and a room 12 is defined in the second end of the body 10 and communicates with the ratchet portion 11. The inner diameter of the room 12 is greater than that of the ratchet portion 11 so as to form a shoulder 13 between the ratchet portion 11 and the room 12.

The body 10 further has two windows 14 defined through the wall thereof, and the two windows are located diametrically opposite to each other. The two windows 14 are located corresponding to the room 12 and communicate with the room 12. Multiple recesses 15 are defined in the inner periphery of the room 12, and each recess 15 has a circular locking portion 16. A driving unit 20 is rotatably received in the through hole 100 and located corresponding to the ratchet portion 11 and the room 12 of the body 10 so as to rotate in two opposite directions or one direction relative to the body 10. The driving unit 20 comprises a driving head 21, a pawl 22, a spring 23, a rotary member 24, a bolt 25, a control rod 26, a ball 261, a resilient member 262, a cap 263 and a screw 264.

The driving head 21 rotatably located corresponding to the ratchet portion 11, and has a connection portion 213 and a flange 211 on two ends thereof. The flange 211 contacts the shoulder 13 so as to restrict the driving head 21 from dropping from the ratchet portion 11. The driving head 21 has a recessed area 212 facing the ratchet portion 11. The connection portion 213 is a rectangular protrusion and extends beyond the body 10 to be connected with a tool with a rectangular recess such as a socket. The connection portion 213 includes a circular hole 215 defined in one side thereof. The driving head 21 includes a passage 214 defined centrally and axially therethrough which communicates with the circular hole 215. The passage 214 includes threads defined therein. The pawl 22 is movably received in the recessed area 212. The pawl 22 includes teeth 221 formed on the front side thereof and the teeth 221 are engaged with the ratchet portion 11. The rear side of the pawl 22 contacts the inside surface of the recessed area 212. A bore 220 is defined in one end of pawl 22. The spring 23 is a heart-shaped spring and located on the top end of the driving head 21. The spring 23 includes a leg 230 extending from one end thereof and the leg 230 is inserted into the bore 220. The other end of the spring 23 has a tip end 231. The rotary member 24 is received in the room 12 and located corresponding to the windows 14. The rotary member 24 is located on the driving head 21. The spring 23 is located between the rotary member 24 and the driving head 21. The rotary member 24 has a cylindrical shifting part 241 extending from the underside thereof and engaged with the tip end 231 of the spring 23. The shifting part is cylindrical rod. The rotary member 24 includes a central hole 242 which communicates with the passage 214. The rotary member 24 includes a serrated outer surface.

When the rotary member 24 is rotated via the windows 14, the shifting part 241 drives the spring 23 to move the pawl 22 in the recessed area 212 to control operational directions of the driving unit 20. The bolt 25 extends through the central hole 242 and is threadedly connected to the passage 214. The head of the bolt 25 contacts the inner bottom of the rotary member 24 that is located around the central hole 242 to pivotably connect the rotary member 24 to the driving head 21. The control rod 26 includes a notch that is located corresponding to the circular hole 215 of the connection portion 213. The control rod 26 has a threaded hole defined in the top end thereof which extends beyond the driving head 21.

The ball 261 is received in the notch and the circular hole 215, and the ball 261 partially protrudes beyond the circular hole 215.

The resilient member 262 is received in the central hole 242 and presses on the bolt 25, or on the inner bottom of the rotary member 24.

The cap 263 seals the central hole 242 and covers the top end of the control rod 26. The cap 263 presses on the resilient member 262. The resilient member 262 is biased between the bolt 25 and the cap 263.

The screw 264 extends through the cap 263 and is threaded connected to the threaded hole in the top end of the control rod 26, so that the cap 263 is co-movable with the control rod 26.

Figure 6:
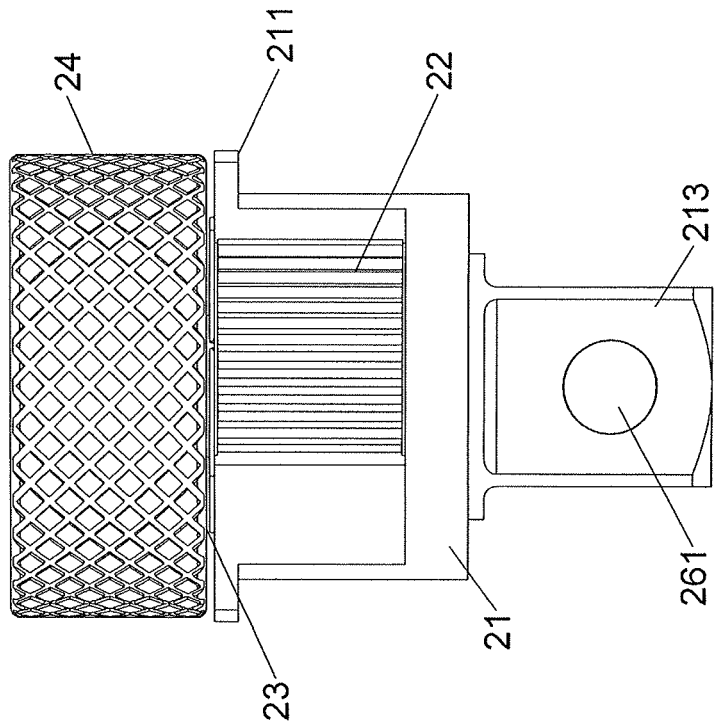
FIG. 6 is a front view of the driving unit of the hand tool assembly of the present invention disclosed in FIG. 5.
Figure 5:
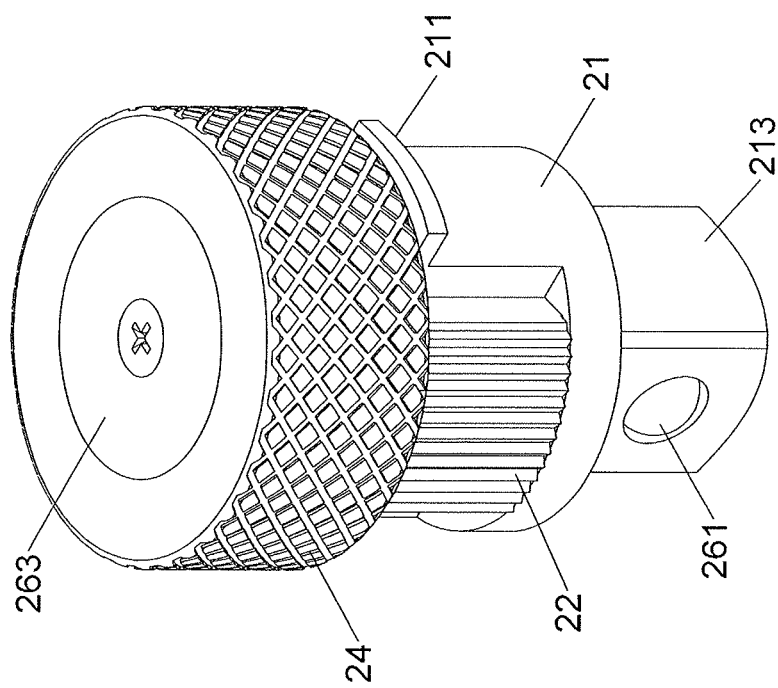
FIG. 5 is a perspective view to show an operational status of the driving unit of the hand tool assembly of the present invention.

As shown in FIGS. 5 and 6, when the rotary member 24 is rotated, the shifting part 241 moves the spring 23 to shift the pawl 22 in the recessed area 212. The rear side of the pawl 22 contacts the inside surface of the recessed area 212 to change the operational direction of the driving unit 20.

The seat 30 is connected to the body 10 and drives the body 10. The driving unit 20 is connected between the body 10 and the seat 30. The seat 30 includes an insertion portion 31 formed on the first end thereof, and the insertion portion 31 is engaged with the room 12. The insertion portion 31 includes multiple protrusions 32 which are respectively received in the recesses 15. The protrusions 32 each have a locking hole 33 which is located corresponding to the locking portion 16. Each locking hole 33 includes inner threads. The seat 30 includes an engaging portion 34 formed on the second end thereof, wherein the engaging portion 34 is a hexagonal portion with a rectangular recess.

Multiple fastening members 40 respectively extend through the locking portions 16 and each have outer threads. The fastening member 40 is connected to the locking holes 33 to connect the body 10 to the seat 30.

A ring-shaped resilient washer 50 is received in the room 12 and located between the rotary member 24 and the engaging portion 34 such that when the rotary member 24 is rotated, a friction is generated between the rotary member 24 and the seat. Alternatively, the resilient washer 50 eliminates the gap between the driving unit 20 and the seat 30.

Figure 7:
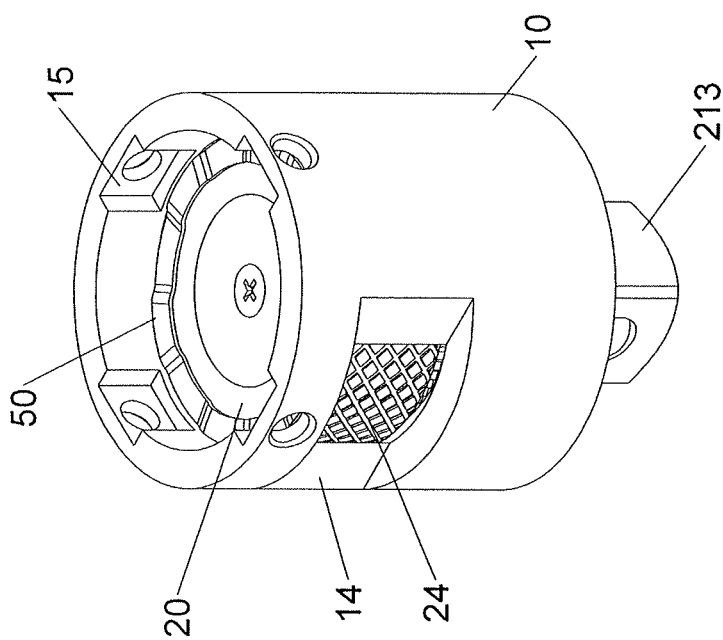
FIG. 7 is a perspective view of a portion of the hand tool assembly of the present invention.

As shown in FIG. 7, when assembling, the driving unit 20 is pivotably installed in the ratchet portion 11 and the room 12. The connection portion 213 protrudes beyond the body 10. The rotary member 24 is located corresponding to the windows 14 so that the users rotate the rotary member 24 via the windows 14 to change the operational direction of the driving unit 20. The washer 50 is located in the room 12 and connected to the rotary member 24.

Figure 8:
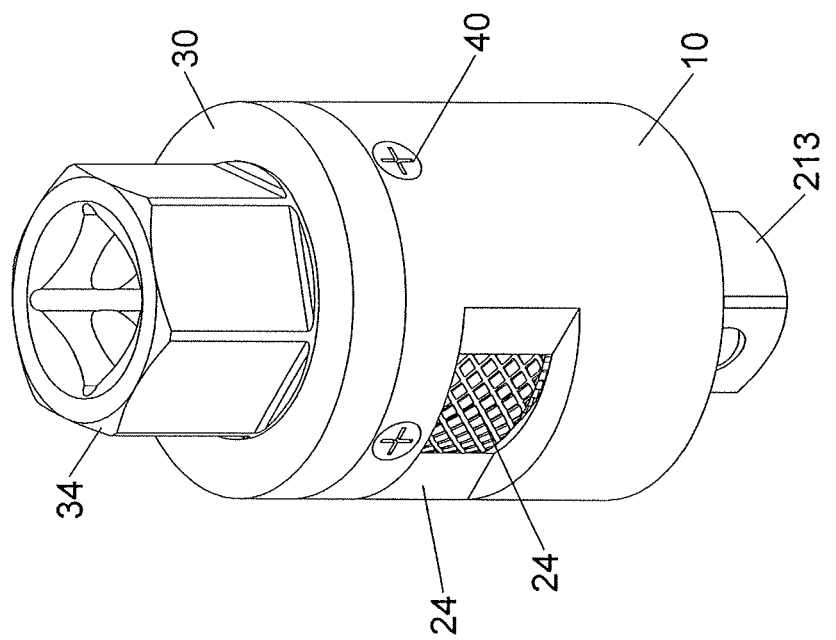
FIG. 8 is a perspective view of the hand tool assembly of the present invention.
Figure 10:
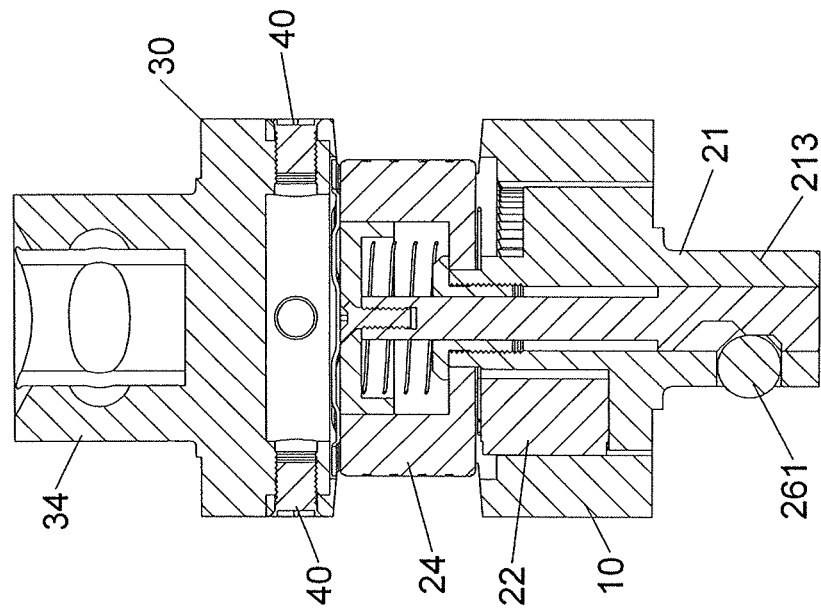
FIG. 10 is a cross sectional view, taken along line 10-10 in FIG. 9.
Figure 9:
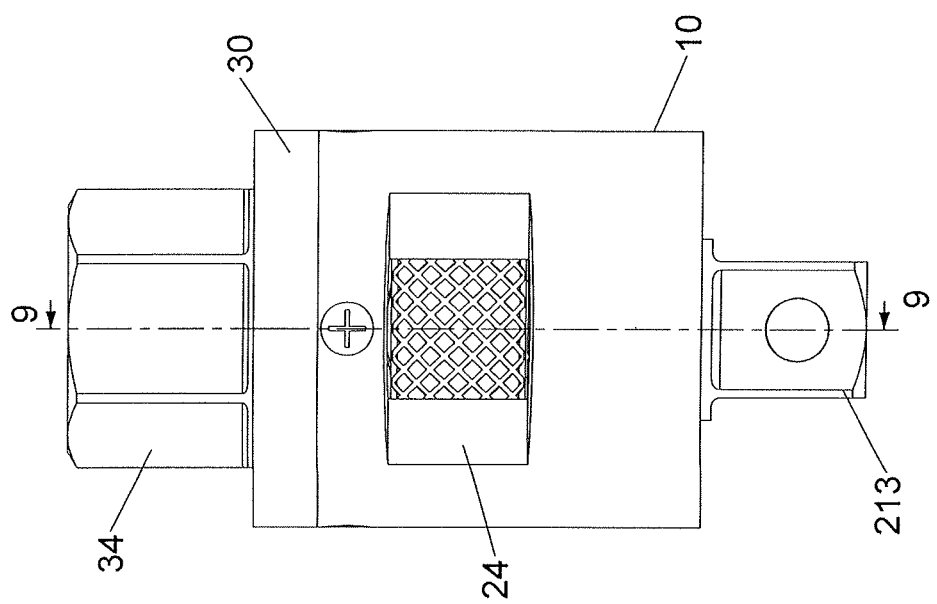
FIG. 9 is a front view of the hand tool assembly of the present invention.

As shown in FIGS. 8 to 10, the insertion portion 31 is inserted into the room 12, and the protrusions 32 are engaged with the recesses 15, and the locking holes 33 are located corresponding to the locking portions 16. The fastening members 40 extend through the locking portions 16 and are connected to the locking holes 33 to connect the seat 30 to the body 10.

As shown in FIG. 10, the engaging portion 34 is a hexagonal portion which is adapted to be connected with a handle to be used as an F-shaped wrench.

Figure 12:
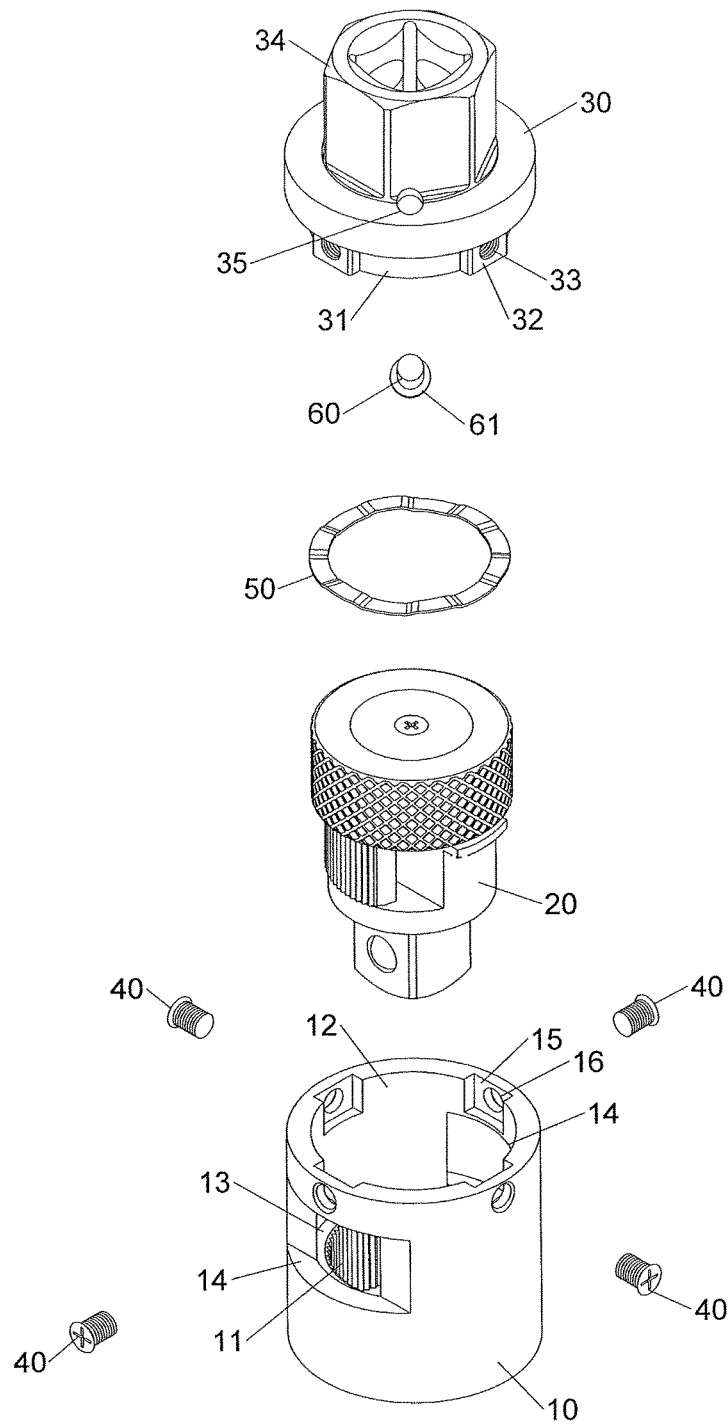
FIG. 12 is an exploded view of the second embodiment of the hand tool assembly of the present invention.
Figure 14:
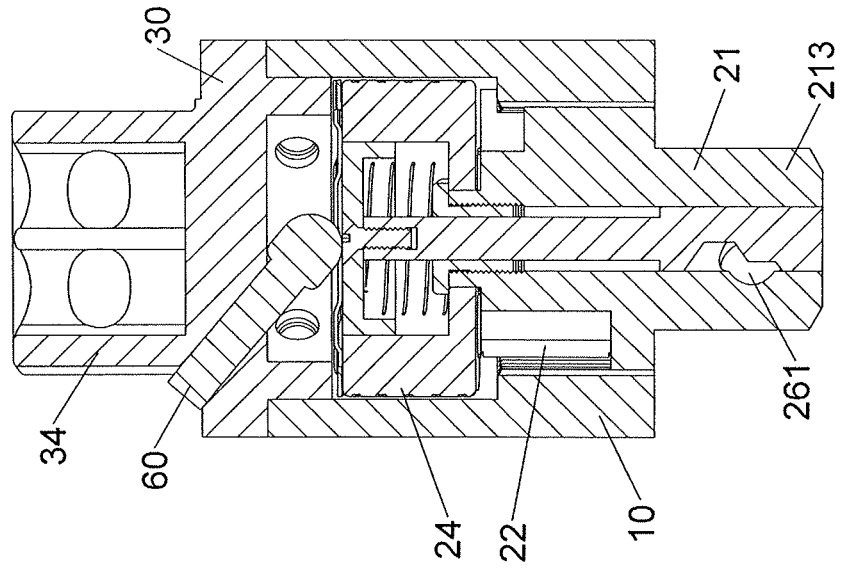
FIG. 14 is a cross sectional view, taken along line 14-14 in FIG. 13.
Figure 13:
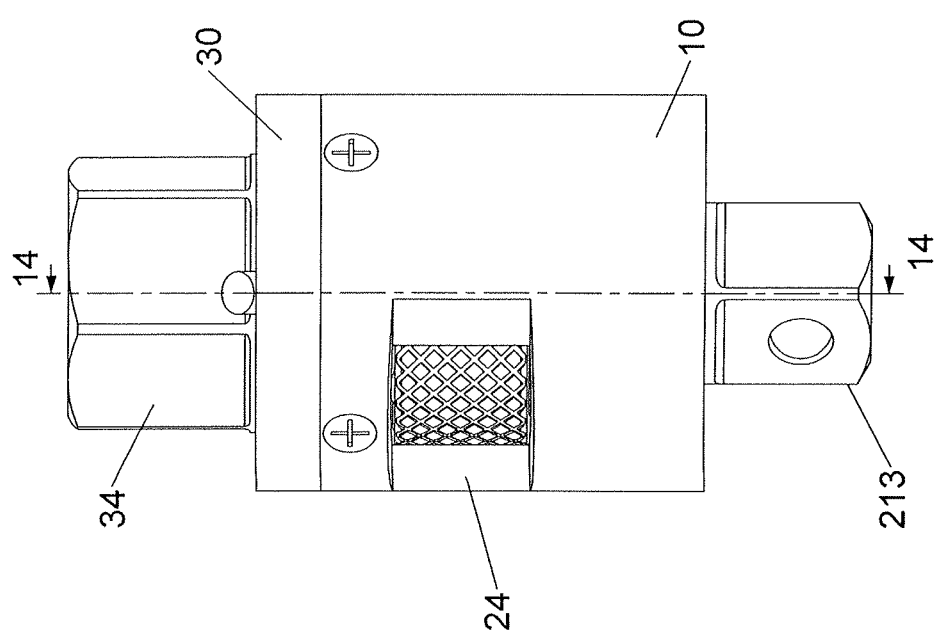
FIG. 13 is a front view of the hand tool assembly of the present invention.

As shown in FIGS. 12 to 14, the seat 30 includes a receiving path 35 which is located corresponding to the cap 263. The receiving path 35 is inclined relative to the axis of the seat 30, and is inclined from outside of the seat 30 toward the center of the seat 30. A push member 60 extends through the receiving path 35. A first end of the push member 60 is exposed beyond the seat 30, and a second end of the push member 60 includes a function portion 61 which contacts the cap 263. The diameter of the function portion 61 is larger than a diameter of the receiving path 35 so that the push member 60 is not separated from the seat 30. When the push member 60 is pushed, the function portion 61 pushes the cap 263, and the cap 263 compresses the resilient member 262. The cap 263 moves the control rod 26 in the passage 214 and the central hole 242, the ball 261 is submerged in the driving head 21. Therefore, the socket or other tool connected to the connection portion 213 can be easily removed.

Figure 15:
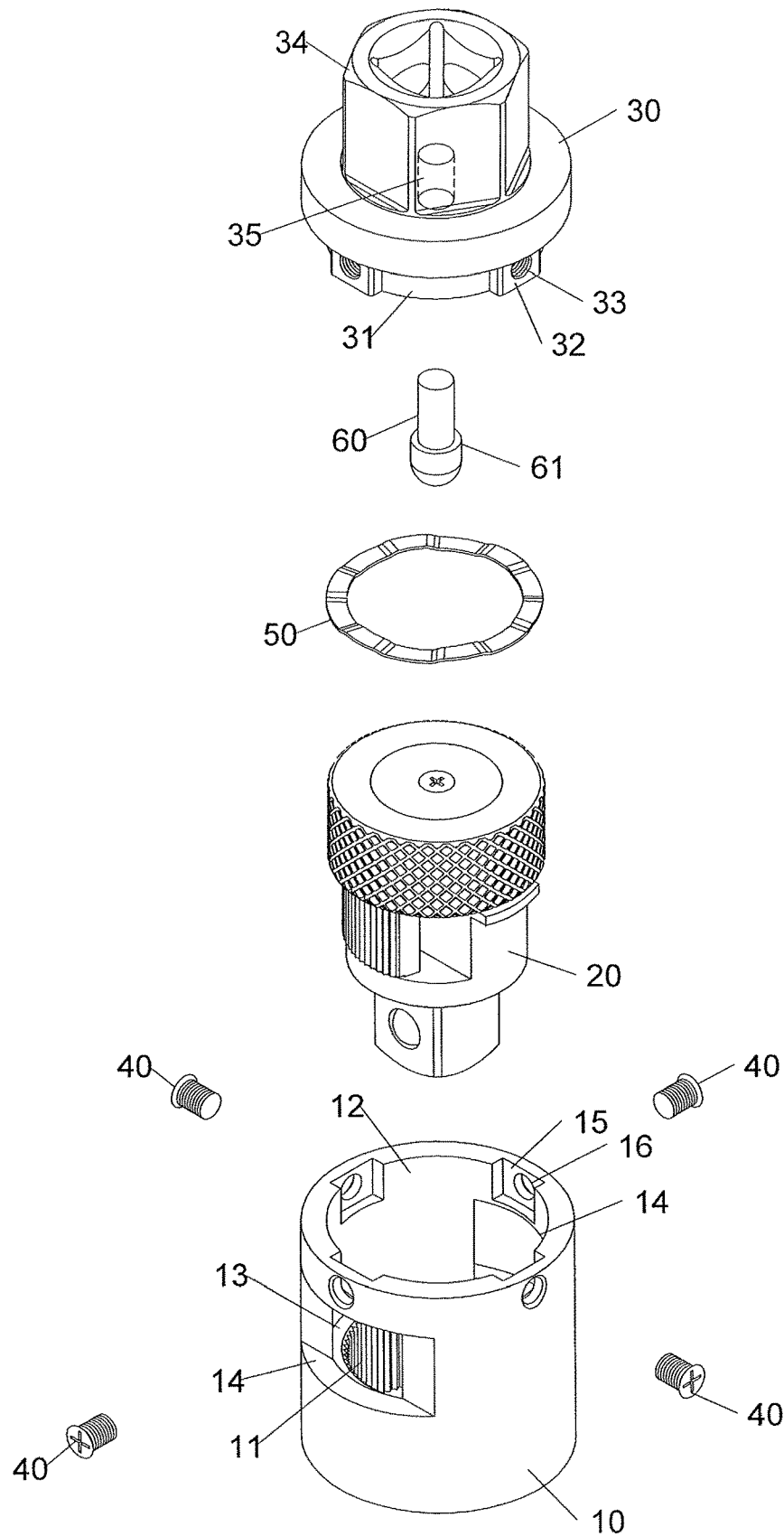
FIG. 15 is an exploded view of the fourth embodiment of the hand tool assembly of the present invention.
Figure 16:
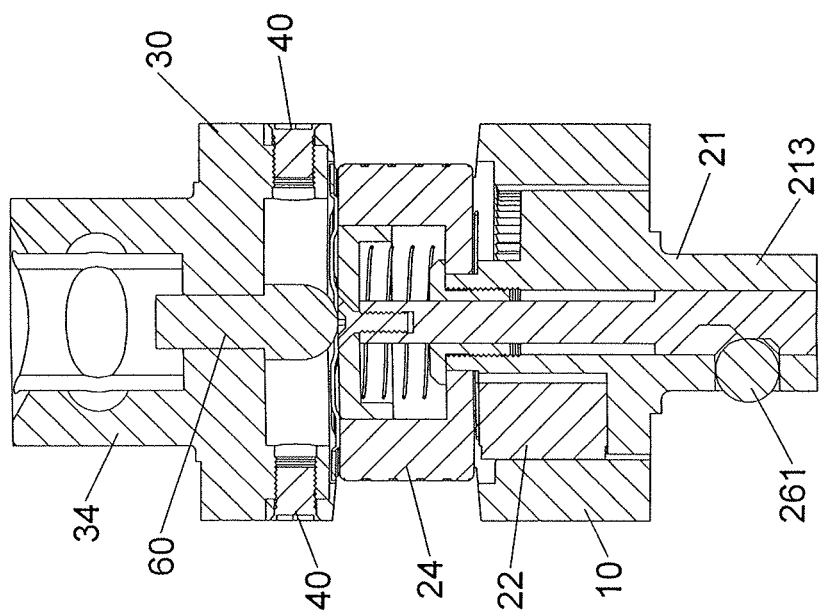
FIG. 16 is a cross sectional view of the fourth embodiment of the hand tool assembly of the present invention.

As shown in FIGS. 15 and 16, compared with the disclosure in FIGS. 13 and 14, the receiving path 35 is defined axially in the seat 30 and the push member 60 extends through the receiving path 35. The function portion 61 extends beyond the receiving path 35 and contacts the cap 263. When the push member 60 is pushed, the socket or other tool connected to the connection portion 213 can be easily removed.

Figure 17:
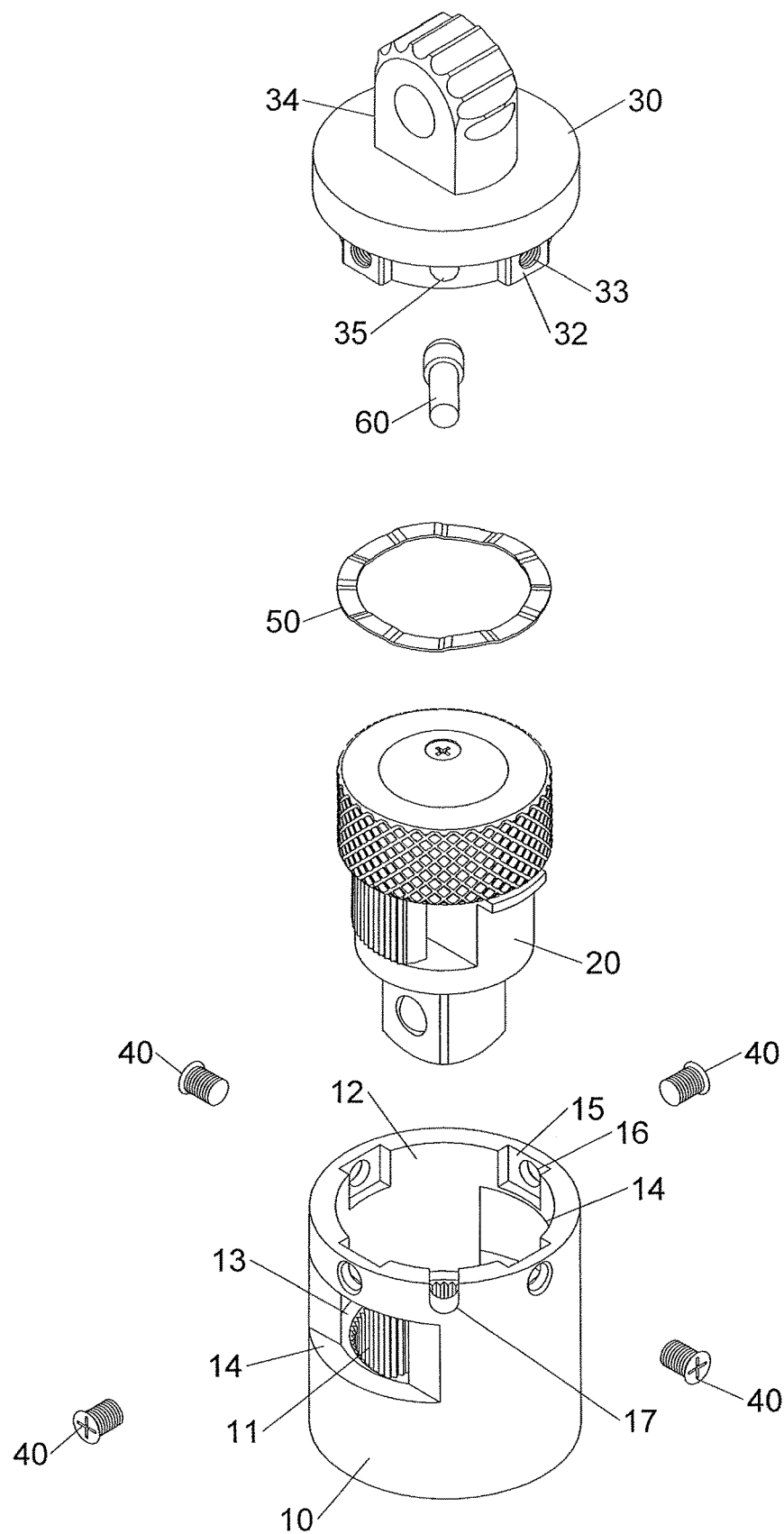
FIG. 17 is an exploded view of the fifth embodiment of the hand tool assembly of the present invention.
Figure 18:
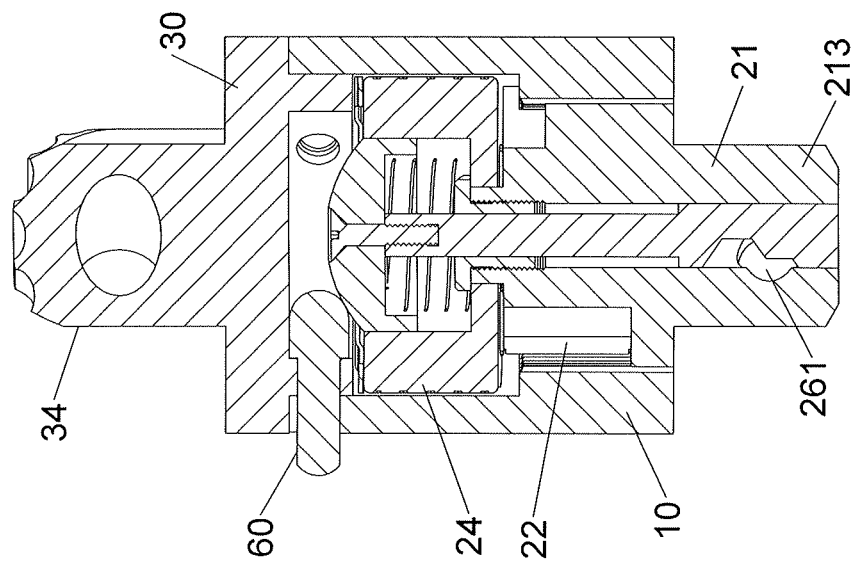
FIG. 18 is a cross sectional view of the fifth embodiment of the hand tool assembly of the present invention.

As shown in FIGS. 17 and 18, the body 10 includes a dent 17 defined therein. The cap 263 has a curved and protruded top which partially extends beyond the central hole 242. The insertion portion 31 includes the receiving path 35 defined therein which is located between two protrusions 32. The receiving path 35 radially extends through the insertion portion 31 and communicates with the room 12. The push member 60 extends through the receiving path 35 and the dent 17.

The push member 60 extends through the receiving path 35 and the dent 17, and one end is exposed from the seat 30 so as to be pushed by users. The function portion 61 is located in the room 12 and contacts the cap 263. The cap 263 pushes the resilient member 262 and moves the control rod 26 in the passage 214 and the central hole 242 to submerge the ball 261 so that the socket or other tool connected to the connection portion 213 can be easily removed.

In one embodiment of the present invention, the driving unit 20 is located in the room 12, and the driving head 21 does not have the passage 214, the circular hole 215, the control rod 26, the resilient member 262, the cap 263 and the screw 264. That is to say, the driving unit 20 does not have the function of quick-removal the socket.

In one embodiment, the driving unit 20 is rotatable in the body 10 in two opposite directions or in one direction in any known ratchet mechanism.

In one embodiment, the ratchet portion 11 includes a first groove. The driving head 21 includes a second groove which is located corresponding to the first groove. A clip is engaged with the first and second grooves to pivotably locate the driving unit 20 in the ratchet portion 11 in the room 12. In this embodiment, the driving head 21 does not have the flange 211.

Figure 11:
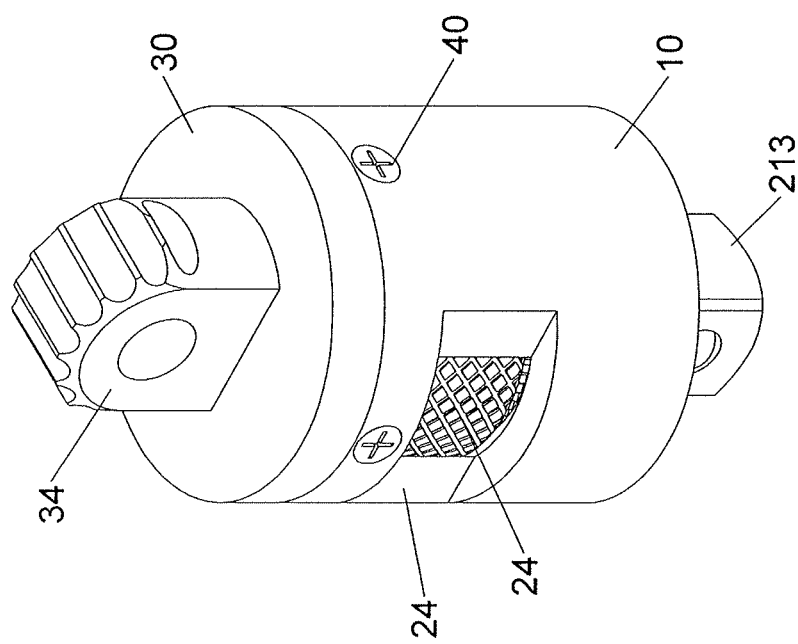
FIG. 11 shows the second embodiment of the hand tool assembly of the present invention.

The advantages of the present invention are that the engaging portion 34 of the seat 30 in FIG. 1 is a hexagonal portion which has a rectangular recess so as to be connected with another hand tool or part. In FIG. 11, the engaging portion 34 is a protrusion which is able to be connected with a handle and used as an F-shaped wrench.

The driving head 21 includes the flange 211, and the rotary member 24 is amended, so that the driving head 21 can be easily connected to the body 10 and the seat 30.

The driving head 21 with the flange 211, and the amended rotary member 24 can be used with conventional hand tool assemblies.

The driving unit 20 is pivotably installed in the body 10. The rotary member 24 is located corresponding to the windows 14. The users can rotate the rotary member 24 via the windows 14, and the shifting part 241 moves the spring 23 to shift the pawl 22 in the recessed area 212 so as to control the operational directions of the driving unit 20.

As shown in FIGS. 14, 16 and 18, when the push member 60, the function portion 61 pushes the cap 263, and the cap 263 pushes the resilient member 262 to control the control rod 26 to move in the passage 214 and the central hole 242. The ball 261 is submerged in the connection portion 213 so that the socket or other tool connected to the connection portion 213 can be easily removed.

While we have shown and described the embodiment in accordance with the present invention, it should be clear to those skilled in the art that further embodiments may be made without departing from the scope of the present invention.

What is claimed is:

1. A hand tool assembly comprising:

a body having a ratchet portion defined in an inner periphery of a first end thereof, a room defined in a second end of the body and communicating with the ratchet portion, an inner diameter of the room being greater than that of the ratchet portion so as to form a shoulder between the ratchet portion and the room, the body having at least one window defined through a wall thereof, the at least one window being located corresponding to the room and communicating with the room, multiple recesses being defined in an inner periphery of the room, each recess having a circular locking portion;

a driving unit rotatably being received in the ratchet portion and the room of the body, the driving unit comprising a driving head, a pawl 2, a spring and a rotary member, the driving head being rotatably located corresponding to the ratchet portion, and having a connection portion and a flange on two ends thereof, the flange contacting the shoulder so as to restrict the driving head from dropping from the ratchet portion, the driving head having a recessed area facing the ratchet portion, the pawl being movably received in the recessed area, the pawl having teeth formed on a front side thereof and the teeth engaged with the ratchet portion, a rear side of the pawl contacting an inside surface of the recessed area, a bore being defined in one end thereof, the spring being a heart-shaped spring and located on a top end of the driving head, the spring having a leg extending from one end thereof and the leg being inserted into the bore, the other end of the spring having a tip end, the rotary member being received in the room and located corresponding to the at least one window, the rotary member being located on the driving head, the spring being located between the rotary member and the driving head, the rotary member having a cylindrical shifting part and being engaged with the tip end of the spring, wherein when the rotary member is rotated, the shifting part drives the spring to move the pawl in the recessed area to control operational directions of the driving unit;

a seat being connected to the body, the driving unit being connected between the body and the seat, the seat having an insertion portion formed on a first end thereof, and the insertion portion being engaged with the room, the insertion portion having multiple protrusions which are respectively received in the recesses, the protrusions each having a locking hole which is located corresponding to the locking portion, each locking hole including inner threads, the seat having an engaging portion formed on a second end thereof;

multiple fastening members respectively extending through the locking portions and each having outer threads, the fastening member being connected to the locking holes to connect the body to the seat, and a ring-shaped resilient washer being received in the room and located between the rotary member and the engaging portion such that when the rotary member is rotated, a friction is generated between the rotary member and the seat, the resilient washer eliminating a gap between the driving unit and the seat.

2. The hand tool assembly as claimed in claim 1, wherein there are multiple windows arranged around the body.

3. The hand tool assembly as claimed in claim 1, wherein there are two windows which are located diametrically opposite to each other.

4. The hand tool assembly as claimed in claim 1, wherein the driving unit is rotatable relative to the body in two directions or in one direction.

5. The hand tool assembly as claimed in claim 1, wherein the connection portion is a rectangular protrusion and extends beyond the body to be adapted to connect a tool with a rectangular recess.

6. The hand tool assembly as claimed in claim 1, wherein the connection portion includes a circular hole defined in one side thereof, the driving head includes a passage defined centrally and axially therethrough which communicates with the circular hole, the passage includes threads defined therein, the rotary member includes a central hole which communicates with the passage, the rotary member includes a serrated outer surface, a bolt extends through the central hole and is threadedly connected to the passage, a head of the bolt contacts an inner bottom of the rotary member that is located around the central hole to pivotably connect the rotary member to the driving head, a control rod extends through the passage from the connection portion and inserted into an axial hole defined in the bolt, the control rod includes a notch that is located corresponding to the circular hole of the connection portion, the control rod has a threaded hole defined in a top end thereof which extends beyond the driving head, a ball partially and movably received in the circular hole in the connection portion and the notch of the control rod, a resilient member is received in the central hole and presses on the bolt, or on the inner bottom of the rotary member, a cap seals the central hole and covers the top end of the control rod, the cap presses on the resilient member, the resilient member is biased between the bolt and the cap, a screw extends through the cap and is threaded connected to the threaded hole in the top end of the control rod.

7. The hand tool assembly as claimed in claim 6, wherein the seat includes a receiving path, a push member extends through the receiving path, a first end of the push member is exposed beyond the seat, a second end of the push member includes a function portion which contacts the cap, an diameter of the function portion is larger than a diameter of the receiving path so that the push member is not separated from the seat, when the push member is pushed, the function portion pushes the cap, and the cap compresses the resilient member, the cap moves the control rod in the passage and the central hole, the ball is submerged in the driving head.

8. The hand tool assembly as claimed in claim 7, wherein the receiving path is inclined relative to an axis of the seat, and inclined from outside of the seat toward a center of the seat.

9. The hand tool assembly as claimed in claim 7, wherein the receiving path is a cylindrical path.

10. The hand tool assembly as claimed in claim 7, wherein the body includes a dent defined therein, the cap has a curved and protruded top which partially extends beyond the central hole, the insertion portion includes the receiving path defined therein which is located between two protrusions, the receiving path radially extends through the insertion portion and communicates with the room, the push member extends through the receiving path and the dent.

11. The hand tool assembly as claimed in claim 1, wherein the engaging portion is a hexagonal portion which has a rectangular recess.

12. The hand tool assembly as claimed in claim 1, wherein the engaging portion is a hexagonal portion which is adapted to be connected with a handle.

* * * * *